United States Patent
Green (10) Patent No.: US 7,518,068 B2
(45) Date of Patent: Apr. 14, 2009

(54) WEIGHT SENSING APPARATUS AND METHODS FOR INVENTORY CONTROL

(75) Inventor: Craig B. Green, Maryland Heights, MO (US)

(73) Assignee: The Boeing Company, Chicago, IL (US)

(*) Notice: Subject to any disclaimer, the term of this patent is extended or adjusted under 35 U.S.C. 154(b) by 1200 days.

(21) Appl. No.: 10/633,187

(22) Filed: Jul. 31, 2003

(65) Prior Publication Data
US 2005/0027603 A1 Feb. 3, 2005

(51) Int. Cl.
*G01G 19/00* (2006.01)
(52) U.S. Cl. ............... 177/25.13; 177/25.19; 177/144; 177/262; 200/85 R; 340/666
(58) Field of Classification Search .......... 200/85 R; 340/666; 177/25.13, 25.19, 144, 262
See application file for complete search history.

(56) References Cited

U.S. PATENT DOCUMENTS

| 3,993,150 | A | * | 11/1976 | Brosh et al. ............... 177/211 |
| 4,108,363 | A | * | 8/1978 | Susumu ...................... 235/383 |
| 4,334,955 | A | * | 6/1982 | Zoeke et al. ................. 159/44 |
| 4,419,734 | A | | 12/1983 | Wolfson et al. |
| 4,582,151 | A | * | 4/1986 | Mairot et al. ............... 177/144 |
| 4,891,755 | A | * | 1/1990 | Asher ......................... 705/28 |
| 4,917,198 | A | * | 4/1990 | Sing ........................ 177/25.14 |
| 5,307,250 | A | * | 4/1994 | Pearson ..................... 362/101 |
| 5,485,684 | A | * | 1/1996 | Philipp et al. ................ 34/226 |
| 6,639,156 | B2 | * | 10/2003 | Luke et al. ............... 177/25.13 |
| 7,295,110 | B2 | * | 11/2007 | Mercier et al. .......... 340/545.6 |

* cited by examiner

*Primary Examiner*—Randy W Gibson (57) ABSTRACT

Systems and methods for automatically reordering parts are disclosed. In one embodiment, a system includes a tray adapted to support parts, and a resilient member operatively engaged with the tray that flexes according to the weight of parts stored on the tray. A switch generates a signal when the amount of parts on the tray is less than a predefined amount. A central processing unit coupled to the switch receives the signal generated by the switch and automatically reorders parts based on the received signal from the switch.

30 Claims, 7 Drawing Sheets

WEIGHT SENSING APPARATUS AND METHODS FOR INVENTORY CONTROL

FIELD OF THE INVENTION

This invention relates generally to inventory control and, more specifically, to automated inventory control.

BACKGROUND OF THE INVENTION

Most prior inventory accounting methods have shortcomings at the input end. Often, inventory is initially taken manually. From then on, constant inventory accounting is maintained by accurate accounting of all transactions into and out of stock. However, that type of inventory accounting is slow, expensive, and requires meticulous acquisition and handling of inventory data. Often the inventory derived by the constant accounting of transactions into and out of stock is inaccurate because of unaccounted for transactions, spoilage, breakage, pilferage, improper identification of number or type of goods in stock, or for other reasons. Accordingly, means have been devised for accurately determining how many items are present at selected storage sites.

U.S. Pat. No. 4,419,734 issued Dec. 6, 1983 to Wolfson et al. is an example of a shelf weight sensing apparatus that analyzes solenoid signals produced by a weight sensor. The weight sensor is attached to a shelf in order to determine the precise number of inventory items located on the specified shelf. This type of system is expensive because it requires extensive circuitry for analyzing the signals received from multiple weight sensors. In addition, this type of system is made for stationary shelving systems which is not conducive to other forms of inventory storage and control.

Therefore, there exists an unmet need to provide a low-cost weight sensing inventory control system for moveable shelves or drawers.

SUMMARY OF THE INVENTION

The present invention provides systems and methods for automatically reordering parts thereby providing inventory control. In one embodiment, a system includes a tray adapted to support a plurality of parts, and a resilient member operatively engaged with the tray and adapted to flex according to the weight of parts stored on the tray. A switch generates a signal when the amount of parts on the tray is less than a predefined amount. A central processing unit coupled to the switch receives the signal generated by the switch and automatically reorders parts based on the received signal from the switch.

In one aspect of the invention, the resilient member includes a leaf spring or a helical spring. In another aspect of the invention, the tray is a slidable drawer having a floor supported by the resilient member. The switch engages one of the floor or the resilient member under a first weight condition and disengages with one of the floor or resilient member under a second weight condition. The first weight condition is greater than the second weight condition.

In a further aspect of the invention, a slidable rail structure supports the drawer and the resilient member supports the rail structure. The switch engages one of the rail structure or resilient member under a first weight condition and disengages one of the rail structure or resilient member under a second weight condition. The first weight condition is greater than the second weight condition.

BRIEF DESCRIPTION OF THE DRAWINGS

The preferred and alternative embodiments of the present invention are described in detail below with reference to the following drawings.

DETAILED DESCRIPTION OF THE INVENTION

The present invention is directed to systems and methods for providing automatic inventory tracking of materials stored in moveable shelves or drawers. Many specific details of certain embodiments of the invention are set forth in the following description and in FIGS. 1-5 to provide a thorough understanding of such embodiments. One skilled in the art, however, will understand that the present invention may have additional embodiments, or that the present invention may be practiced without several of the details described in the following description.

Figure 1:
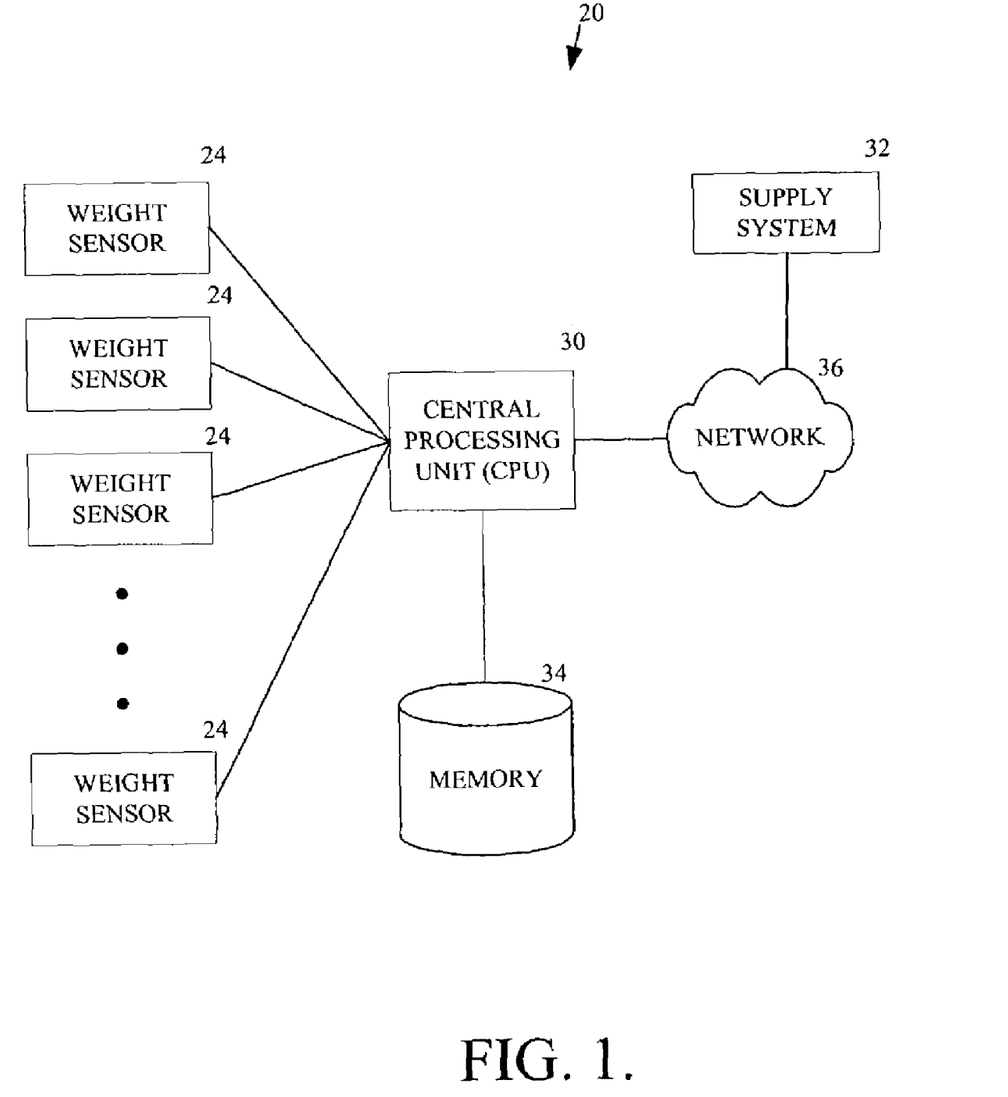
FIG. 1 illustrates a block diagram of an example system formed in accordance, with an embodiment of the present invention.

In one embodiment, the present invention is an automated inventory control system that uses movable weight sensing shelves or drawers for providing inventory trigger signals based on a sensed weight of a shelf or a drawer that stores an inventory of parts. FIG. 1 illustrates an exemplary computer-based system 20 that automatically performs inventory sensing and automatic reordering based on a sensed inventory. The system 20 includes a plurality of weight sensors 24 located in conjunction with slidable shelves or drawers that are operatively coupled to a central processing unit (CPU) 30. The CPU 30 is connected to memory 34 and to a supply system 32 over a public or private data network 36. It will be appreciated that the CPU 30 may communicate in various other ways, such as, without limitation, by facsimile or electronic mail, with the supply system 32.

Figure 2:
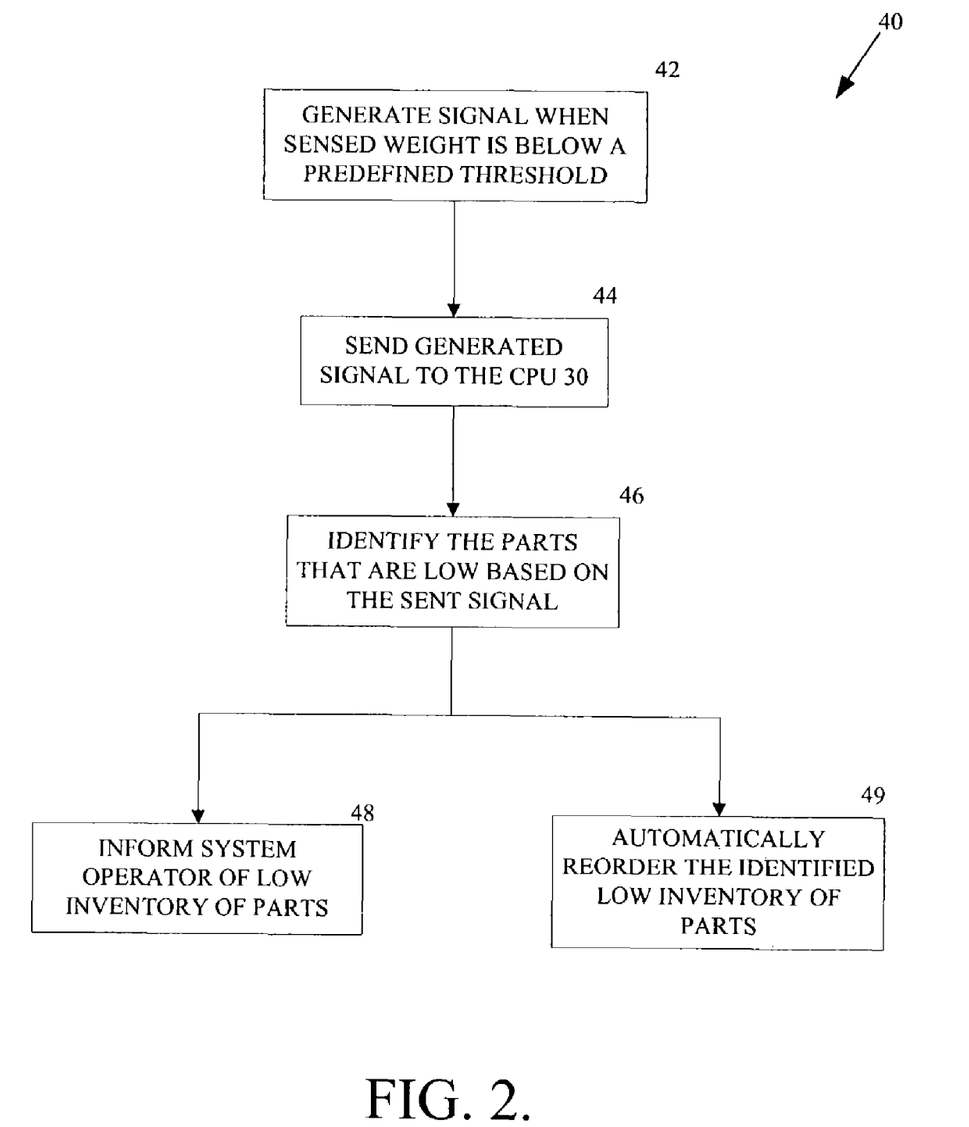
FIG. 2 illustrates a flow diagram of an example process performed by the system shown in FIG. 1 in accordance with an embodiment of the present invention.

FIG. 2 illustrates an exemplary method 40 performed by the system 20 (FIG. 1) in accordance with an embodiment of the invention. First, at block 42, each weight sensor 24 may generate a signal when the sensed weight of parts, materials, goods, etc. in the respective shelf falls below a predefined threshold amount. Next, at block 44, the generated signal is sent to the CPU 30. At block 46, the CPU 30 identifies the part or parts that are associated with the weight sensor 24 that generated and sent the signal. In one embodiment, the CPU 30 may use information stored within the memory 34 to identify the part stored on the shelf or drawer associated with the weight sensor 24. For example, the CPU 30 determines the part that is associated with the weight sensor 24 by comparing the identifier to a list or table previously stored in the memory 34. In another embodiment, an identifier may be included in the signal generated by the weight sensor 24. Next, at block 48, the CPU 30 may inform inventory control personnel that the part within the shelf or drawer that is associated with the weight sensor 24 that generated and sent the signal is low. The CPU 30 may automatically request a re-order for the part associated with the shelf or drawer at block 49 via the network 36, email, fax, etc. It will be appreciated that the CPU 30 can perform ordering in a number of ways, including, for example, by sending a message directly to a re-supplier or the supply system 32 over the network 36.

In an alternate embodiment, the weight sensor 24 activates a light or some other indicator (visual or audible) at the shelf or drawer or at a central location for providing a visual indication of the need for restocking/re-ordering to an employee.

Figure 3:
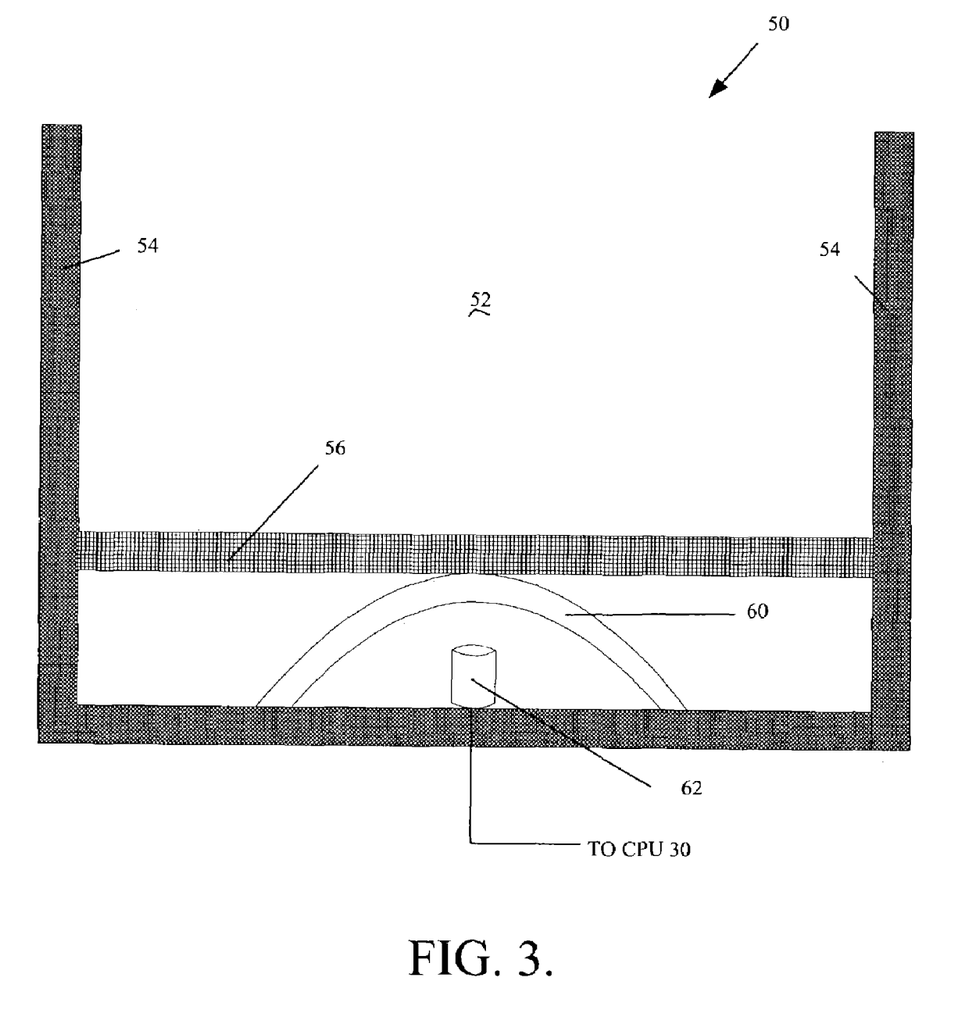
FIGS. 3, 4, 5A-C, 6, and 7 illustrate various embodiments of weight sensors incorporated into a storage unit.

FIG. 3 illustrates a cross-sectional view of an exemplary inventory storage shelf 50 in accordance with another embodiment of the present invention. The shelf 50 includes a storage area 52 that is formed by sidewalls 54 and a weight sensing floor 56. The weight sensing floor 56 is supported by a leaf spring 60. The leaf spring 60 allows the weight sensing floor 56 to move within the storage area 52 based on the amount of weight the weight sensing floor 56 supports. The weight sensing floor 56 is preferably not permanently attached to any of the sidewalls 54. In this embodiment, a switch 62 is positioned underneath the weight sensing floor 56. The switch 62 maintains contact with the leaf spring 60 or the weight sensing floor 56 as long as the weight of the parts supported by the weight sensing floor 56 is greater than a threshold amount. If the weight of the items on the weight sensing floor 56 falls below the threshold amount, in other words the number of parts within of the shelf 50 is below a threshold amount, the leaf spring 60 forces the weight sensing floor 56 away from the switch 62 thereby toggling or triggering the switch 62. The toggled switch 62 sends a signal to the CPU 30. For example, if the shelf 50 includes a number of two-ounce bolts and the user wants the shelf 50 to begin a re-supply activity when there are only eight bolts left within the shelf 50, then the type of leaf spring 60 is selected so it forces the weight sensing floor 56 away from the switch 62 when only a pound of parts (16 oz.) remains.

Figure 4:
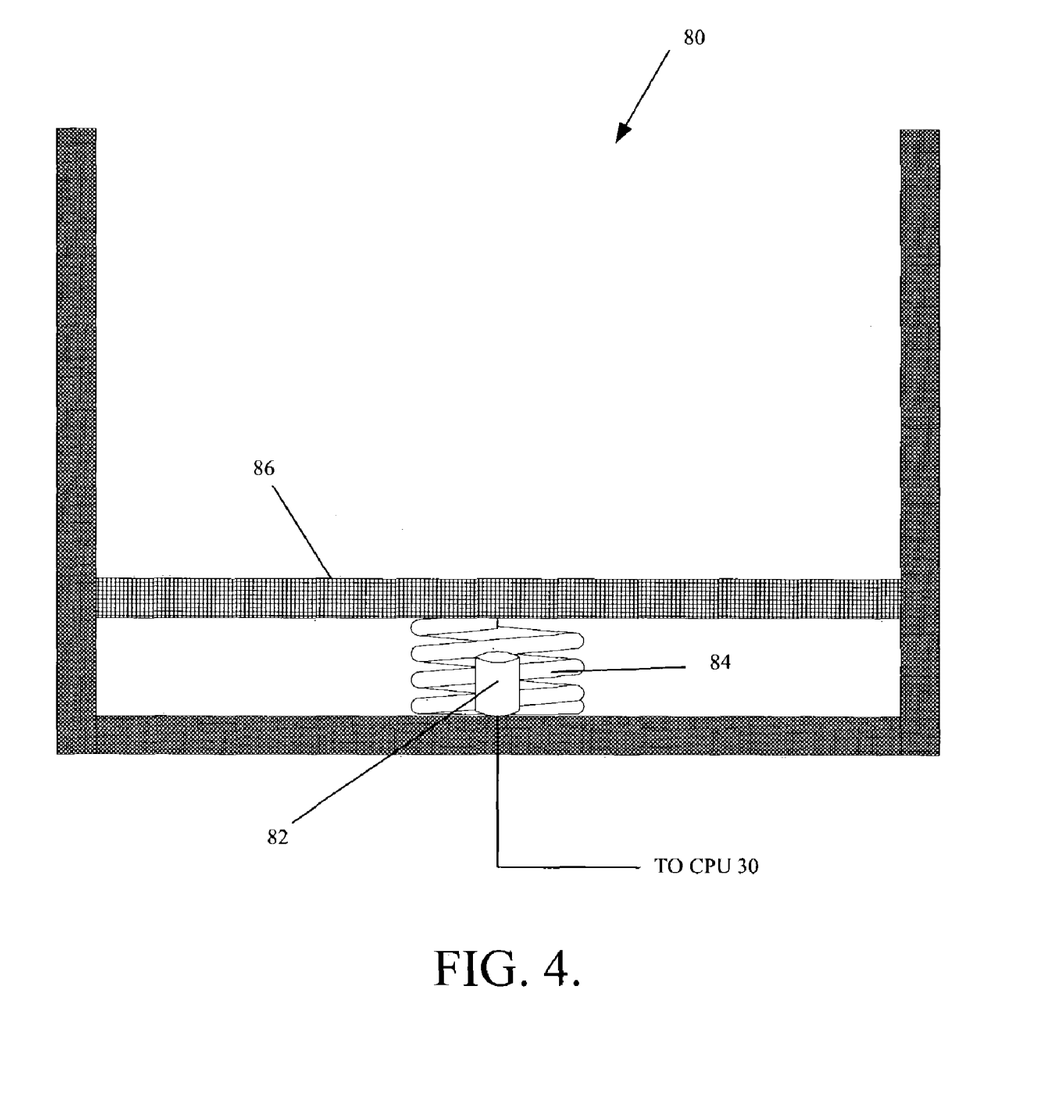

FIG. 4 illustrates a cross-sectional view of an exemplary inventory storage shelf 80 that includes a helical spring 84 and a switch 82 in accordance with yet another embodiment of the present invention. The helical spring 84 supports a weight sensing floor 86 similar in manner to the leaf spring 60 (FIG. 3) described above. The switch 82 is coupled to the CPU 30 and operates similarly to the switch 62 (FIG. 3). It will be appreciated that other devices may be used for creating weight induced movement within the shelves 50 or 80.

Figure 5A:
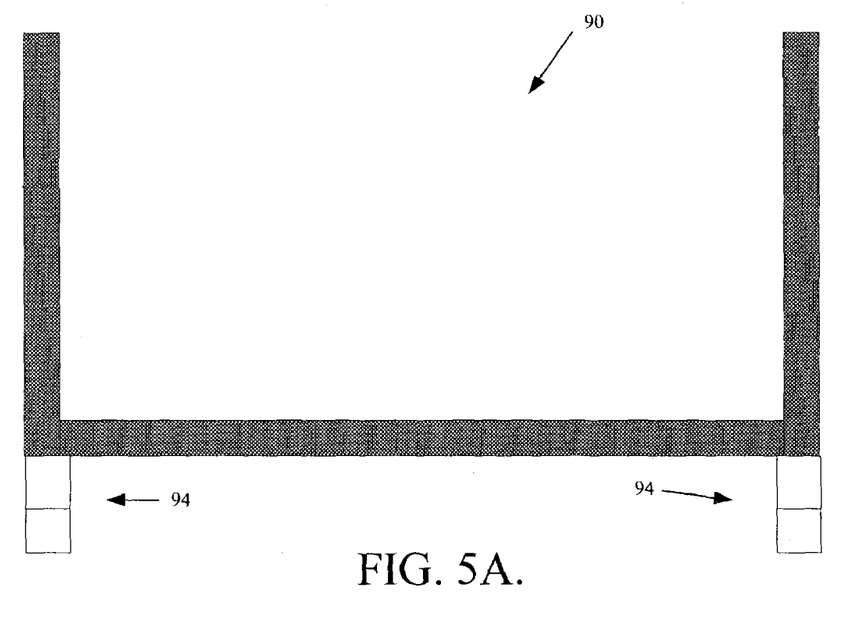
Figure 5B:
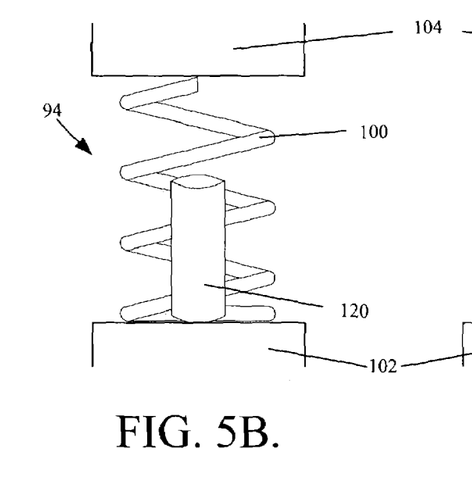
Figure 5C:
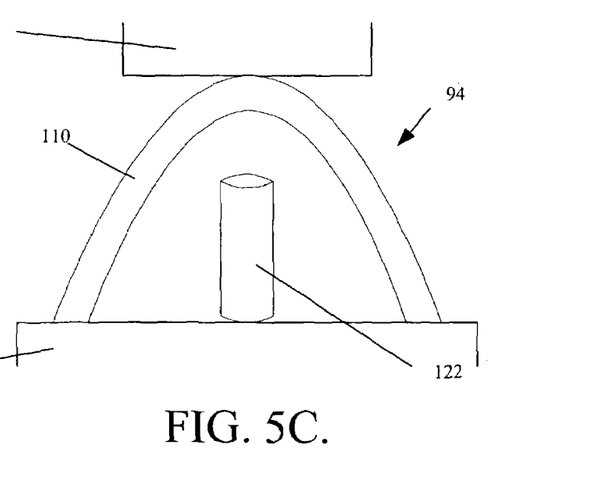

FIG. 5A illustrates a cross-sectional view of a slidable shelf 90 connected to a rail system 94 in accordance with another embodiment of the present invention. The rail system 94 allows the shelf 90 to slide within a larger cabinet or frame structure (not shown). FIGS. 5B and 5C illustrate further embodiments of the rail system 94. As shown in FIG. 5B, a helical coil 100 is connected to a support structure 102 and a base portion 104 of the rail system 94. The base portion 104 is a stationary part (bottom rail) of the rail system 94. A top rail (not shown) is slideably received by the base portion 104 and is attached to the shelf 90. In one representative embodiment, the support structure 102 may be a cabinet. A horizontally sliding portion (not shown) of the rail system 94 supports the shelf 90 and is slideably received by the base portion 104. A switch 120 is positioned between the base portion 104 and the structure 102. The spring 100 and switch 120 operate similarly to those in the shelves 50 and 80 (FIGS. 3 and 4).

As shown in FIG. 5C, in another alternate embodiment, a leaf spring 110 may be used to support the base portion 104 with respect to the structure 102. A switch 122 is positioned between the base portion 104 and structure 102. The spring 110 and switch 122 operate similarly to those in the shelves 50 and 80 (FIGS. 3 and 4). It will be appreciated that in further embodiments, the leaf and coil springs shown in FIGS. 3-5 may be replaced with a variety of other resilient members, including, for example, rubber or other polymeric compressible members, hydraulic or pneumatic cylinders, or any other suitable resilient members.

Figure 6:
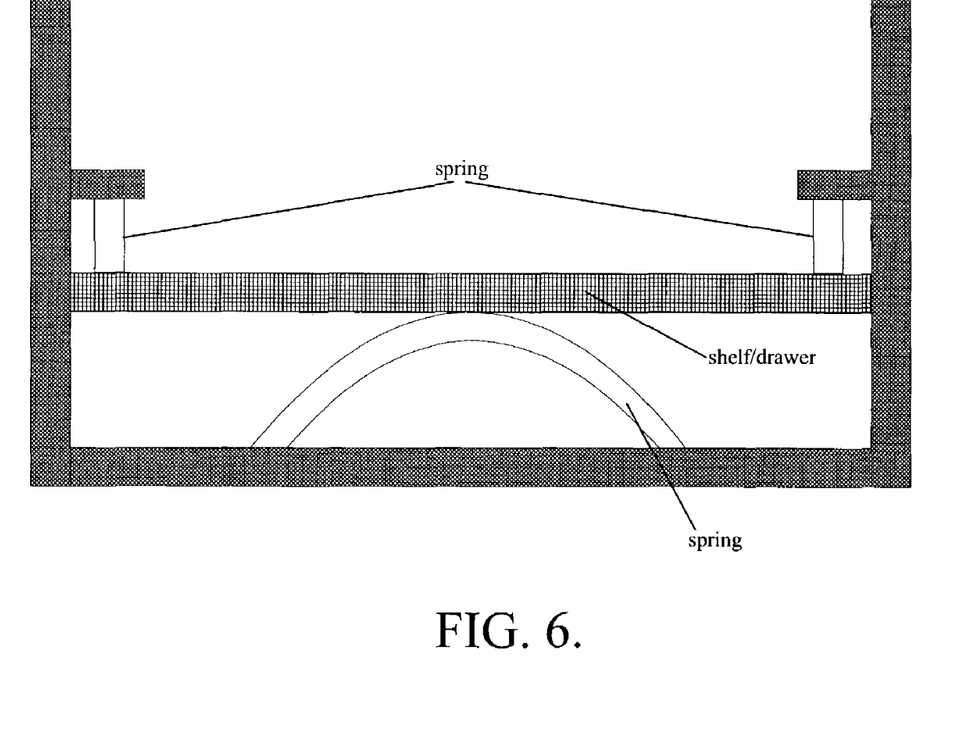
Figure 7:
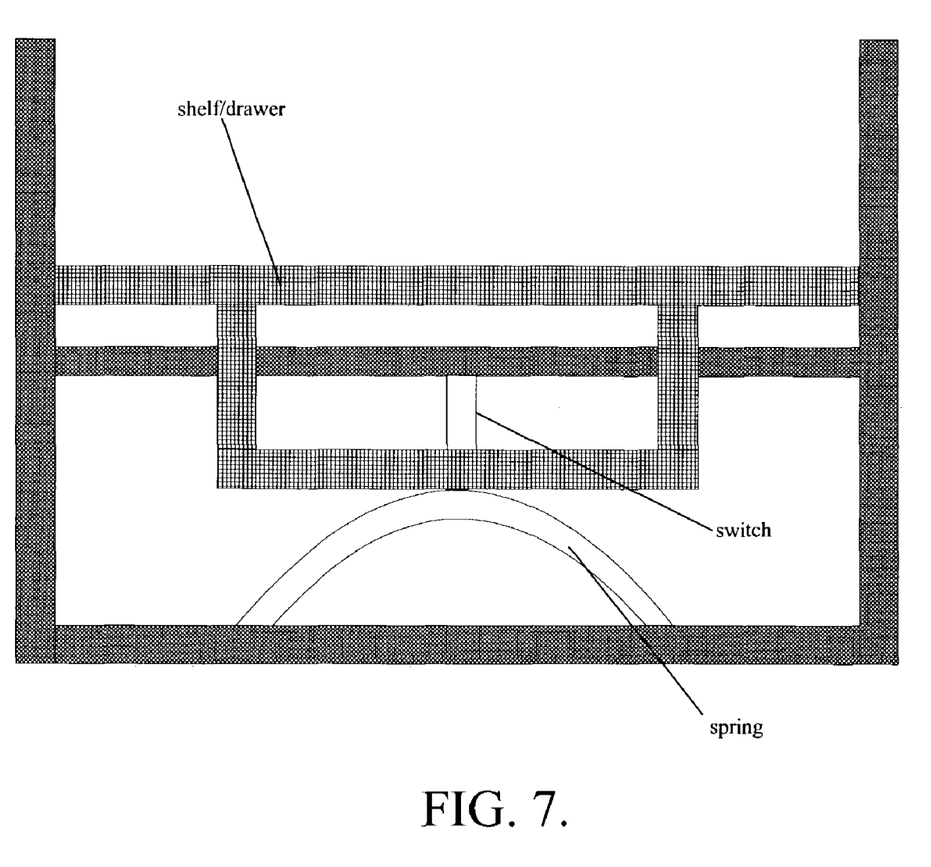

As shown in FIGS. 6 and 7, switches operate by being depressed with lighter weight on a shelf. The rail structure can be configured to perform the same function.

While the preferred embodiment of the invention has been illustrated and described, as noted above, many changes can be made without departing from the spirit and scope of the invention. Accordingly, the scope of the invention is not, limited by the disclosure of the preferred embodiment. Instead, the invention should be determined entirely by reference to the claims that follow.

What is claimed is:

1. A weight sensing shelf device, comprising:
   a movable weight sensing tray configured to support items;
   a resilient member operatively engaged with the movable weight sensing tray and configured to flex according to the weight of items stored on the movable weight sensing tray; and
   a switch configured to generate a signal when the amount of items on the movable weight sensing tray is less than a predefined amount, the signal is sent to a central processing unit that automatically reorders items based on the signal received from the switch.

2. The device of claim 1, wherein the resilient member includes a leaf spring.

3. The device of claim 1, wherein the resilient member includes a coil spring.

4. The device of claim 1, wherein the signal generated by the switch is sent to a central processing unit (CPU), the CPU automatically reorders items by sending a request to a supplier through at least one of a network, a facsimile, or a postal transmission.

5. The device of claim 1, wherein the tray includes a horizontally slidable drawer.

6. The device of claim 5, wherein the horizontally slidable drawer includes a floor supported by the resilient member.

7. The device of claim 6, wherein the switch engages at least one of the floor and the resilient member under a first weight condition and disengages with the at least one of the floor and resilient member under a second weight condition.

8. The device of claim 7, wherein the first weight condition is greater than the second weight condition.

9. The device of claim 5, further comprising a slidable rail structure for supporting the drawer, and wherein the resilient member supports the rail structure.

10. The device of claim 9, wherein the switch engages one of the rail structure or resilient member under a first weight condition and disengages one of the rail structure or resilient member under a second weight condition.

11. The device of claim 10, wherein the first weight condition is greater than the second weight condition.

12. A system for automatically reordering items, the system comprising:
    a movable weight sensing tray configured to support items;
    a resilient member coupled to the movable weight sensing tray and configured to flex according to the weight of items stored on the movable weight sensing tray;
    a switch configured to generate a signal when the amount of items on the movable weight sensing tray is less than a predefined amount; and
    a central processing unit coupled to the switch, the central processing unit including:
       a first component configured to receive signals generated by the switch; and a second component configured to automatically reorder items based on the received signal from the switch.

13. The system of claim 12, wherein the resilient member includes a leaf spring.

14. The system of claim 12, wherein the resilient member includes a coil spring.

15. The system of claim 12, wherein the tray includes is a horizontally slidable drawer.

16. The system of claim 15, wherein the horizontally slidable drawer includes a floor supported by the resilient member.

17. The system of claim 16, wherein the switch engages one of the floor or the resilient member under a first weight condition and disengages with one of the floor or resilient member under a second weight condition.

18. The system of claim 17, wherein the first weight condition is greater than the second weight condition.

19. The system of claim 15, further comprising a slidable rail structure for supporting the drawer, and wherein the resilient member supports the rail structure.

20. The system of claim 19, wherein the switch engages one of the rail structure or resilient member under a first weight condition and disengages one of the rail structure or resilient member under a second weight condition.

21. The system of claim 20, wherein the first weight condition is greater than the second weight condition.

22. The system of claim 12, wherein the second component is configured to generate a reorder request and the first component is configured to send the generated reorder request to a supplier.

23. The system of claim 22, wherein the first component is configured to send the generated request to the supplier via at least one of a network, a facsimile, or a postal transmission.

24. A method for automatically reordering items, the method comprising:

supporting items in a horizontally slidable weight sensing tray with a resilient member;

generating a signal by a switch when the amount of items on the weight sensing tray is less than a predefined amount;

receiving the generated signals at a central processing unit; and automatically reordering items based on the received signal from the switch, wherein the signal is sent to a central processing unit.

25. The method of claim 24, wherein the slidable tray includes a floor supported by the resilient member.

26. The method of claim, 24, wherein generating the signal includes generating the signal when the tray is at a weight condition less than a threshold amount.

27. The method of claim 24, wherein automatically reordering items includes generating a reorder request and sending the generated reorder request to a supplier.

28. The method of claim 24, wherein sending the generated reorder request to the supplier includes sending the generated reorder request to a supplier via at least one of a network, a facsimile, or postal.

29. The method of claim 24, further comprising outputting a signal requesting resupply based on the received signal from the switch.

30. The method of claim 29, wherein the outputting includes activating a light.

* * * * *